(12) United States Patent
Bian

(10) Patent No.: US 11,409,040 B1
(45) Date of Patent: Aug. 9, 2022

(54) OPTICAL COUPLERS FOR RIDGE-TO-RIB WAVEGUIDE CORE TRANSITIONS

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/209,689

(22) Filed: Mar. 23, 2021

(51) Int. Cl.
| | | |
|---|---|---|
| *G02B 6/24* | (2006.01) |
| *G02B 6/30* | (2006.01) |
| *G02B 6/122* | (2006.01) |
| G02B 6/02 | (2006.01) |
| G02B 6/12 | (2006.01) |

(52) U.S. Cl.
CPC .............. *G02B 6/24* (2013.01); *G02B 6/122* (2013.01); *G02B 6/305* (2013.01); *G02B 6/02319* (2013.01); *G02B 2006/12097* (2013.01)

(58) Field of Classification Search
None
See application file for complete search history.

(56) References Cited

U.S. PATENT DOCUMENTS

| | | | | |
|---|---|---|---|---|
| 5,577,141 A * | 11/1996 | Adar | ...................... | G02B 6/122 385/43 |
| 6,289,157 B1 * | 9/2001 | Kawamoto | ............ | G02B 6/122 385/124 |
| 10,816,726 B1 | 10/2020 | Peng et al. | | |
| 2001/0036338 A1 * | 11/2001 | Matsushima | ........ | G02B 6/1228 385/50 |
| 2004/0114869 A1 | 6/2004 | Fike et al. | | |
| 2005/0123244 A1 | 6/2005 | Block et al. | | |
| 2007/0280326 A1 * | 12/2007 | Piede | .................. | H01S 5/06804 372/99 |
| 2008/0193080 A1 * | 8/2008 | Cheben | .................... | G02B 6/14 385/124 |
| 2010/0054662 A1 * | 3/2010 | Hofrichter | ............... | G02B 6/30 264/1.25 |
| 2016/0282558 A1 * | 9/2016 | Hutchison | ................ | G02B 6/14 |
| 2018/0003895 A1 * | 1/2018 | Baudot | ............... | G02B 6/1228 |

(Continued)

FOREIGN PATENT DOCUMENTS

JP   2010-281899 A   * 12/2010

OTHER PUBLICATIONS

Yusheng Bian et al., "Edge Couplers With Stacked Layering" filed Apr. 27, 2020 as U.S. Appl. No. 16/859,347.

(Continued)

*Primary Examiner* — Michael Stahl
(74) *Attorney, Agent, or Firm* — Thompson Hine LLP; Anthony Canale

(57) ABSTRACT

Structures for an optical coupler and methods of fabricating a structure for an optical coupler. A first plurality of segments are positioned with a first spaced arrangement along a longitudinal axis, and a second plurality of segments are positioned with a second spaced arrangement along the longitudinal axis between the first plurality of segments and a waveguide core. A slab layer has a plurality of sections respectively connected to the second plurality of segments. The second plurality of segments have a first thickness, and the slab layer has a second thickness that is less than the first thickness.

20 Claims, 6 Drawing Sheets

(56) References Cited

U.S. PATENT DOCUMENTS

2019/0219760 A1* 7/2019 Kim .................. G02B 6/1228
2021/0055478 A1 2/2021 Bian et al.

OTHER PUBLICATIONS

Bo Peng et al., "Optical Fiber Coupler Having Hybrid Tapered Waveguide Segments and Metamaterial Segments" filed Dec. 23, 2019 as U.S. Appl. No. 16/724,507.

Sahin et al., "Methods of Forming a V-Groove for a Fiber Optics Cable on an Integrated Photonics Chip", filed Mar. 3, 2020 as U.S. Appl. No. 16/807,811.

G. Jiang et al., "Slab-Modulated Sidewall Bragg Gratings in Silicon-on-Insulator Ridge Waveguides," in IEEE Photonics Technology Letters, vol. 23, No. 1, pp. 6-8, Jan. 1, 2011.

Daoxin Dai et al., "Mode conversion in tapered submicron silicon ridge optical waveguides," Opt. Express 20, 13425-13439 (2012).

Long Chen et al., "Compact, low-loss and low-power 8×8 broadband silicon optical switch," Opt. Express 20, 18977-18985 (2012).

P. Dong et al., "Low loss shallow-ridge silicon waveguides", Optics Express. Jul. 2010;18(14):14474-14479.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Pavel Cheben, et al., "Refractive index engineering with subwavelength gratings for efficient microphotonic couplers and planar waveguide multiplexers," Opt. Lett. 35, 2526-2528 (2010).

Pavel Cheben et al., "Broadband polarization independent nanophotonic coupler for silicon waveguides with ultra-high efficiency," Opt. Express 23, 22553-22563 (2015).

Mu, X et al., "Edge Couplers in Silicon Photonic Integrated Circuits: A Review" Appl. Sci. 2020, 10, 1538.

G. Roelkens, et al., "Laser emission and photodetection in an InP/InGaAsP layer integrated on and coupled to a Silicon-on-Insulator waveguide circuit," Opt. Express 14, 8154-8159 (2006).

J. V. Galan et al., "CMOS compatible silicon etched V-grooves integrated with a SOI fiber coupling technique for enhancing fiber-to-chip alignment," 2009 6th IEEE International Conference on Group IV Photonics, San Francisco, CA, USA, 2009, pp. 148-150.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2.

B. Peng et al., "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

* cited by examiner

OPTICAL COUPLERS FOR RIDGE-TO-RIB WAVEGUIDE CORE TRANSITIONS

BACKGROUND

The present invention relates to photonics chips and, more specifically, to structures for an optical coupler and methods of fabricating a structure for an optical coupler.

Photonics chips are used in many applications and systems including data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

Optical couplers may be used in photonics chips for transferring optical signals between different types of waveguide cores. Efficient coupling between waveguide cores requires conversion from the mode profile of one waveguide core into the mode profile of the other waveguide core. Poor modal overlap may cause coupling during the transfer to non-guided radiation modes or coupling during the transfer to unwanted guided radiation modes. Conventional optical couplers used to transfer optical signals between different waveguide cores may include lengthy continuous tapers that have a gradually narrowing width from one waveguide core to the other waveguide core.

Improved structures for an optical coupler and methods of fabricating a structure for an optical coupler are needed.

SUMMARY

In an embodiment of the invention, a structure includes a waveguide core, a first plurality of segments positioned with a first spaced arrangement along a longitudinal axis, and a second plurality of segments positioned with a second spaced arrangement along the longitudinal axis between the first plurality of segments and the waveguide core. The structure further includes a slab layer having a plurality of sections respectively connected to the second plurality of segments. The second plurality of segments have a first thickness, and the slab layer has a second thickness that is less than the first thickness.

In an embodiment of the invention, a method includes forming a waveguide core, forming a first plurality of segments positioned with a first spaced arrangement along a longitudinal axis, forming a second plurality of segments positioned with a second spaced arrangement along the longitudinal axis between the first plurality of segments and the first waveguide core, and forming a slab layer including a plurality of sections respectively connected to the second plurality of segments. The second plurality of segments have a first thickness, and the slab layer has a second thickness that is less than the first thickness.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
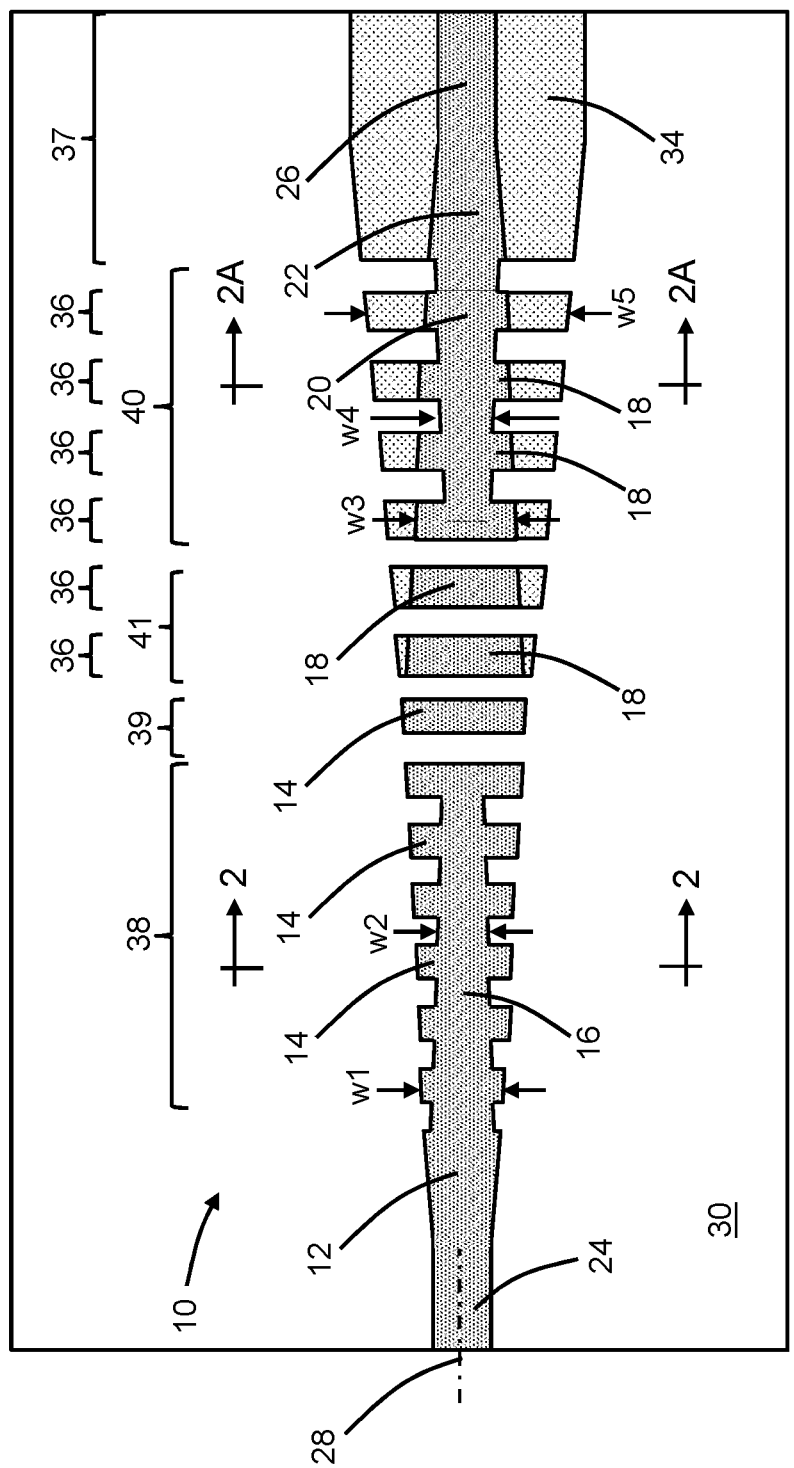
FIG. 1 is a top view of a structure at an initial fabrication stage of a processing method in accordance with embodiments of the invention.
Figure 2:
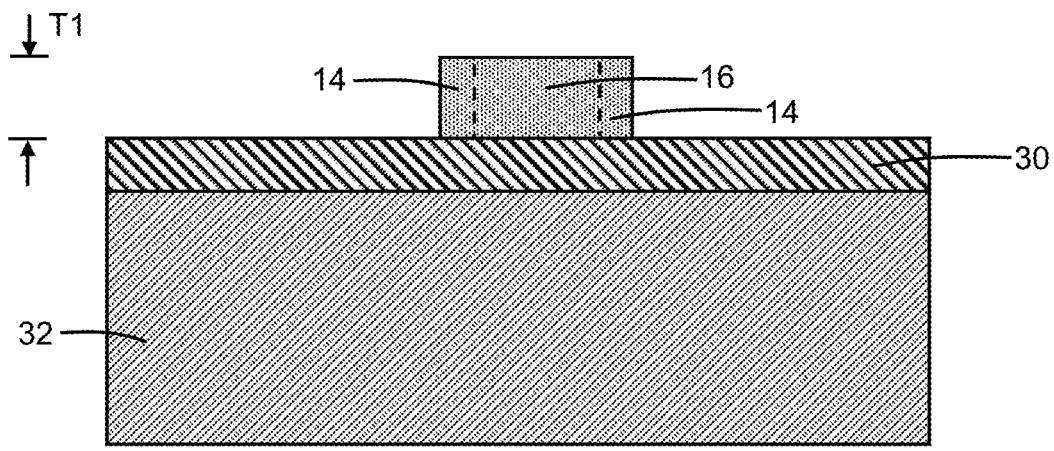
FIG. 2 is a cross-sectional view of the structure taken generally along line 2-2 in FIG. 1.
Figure 2A:
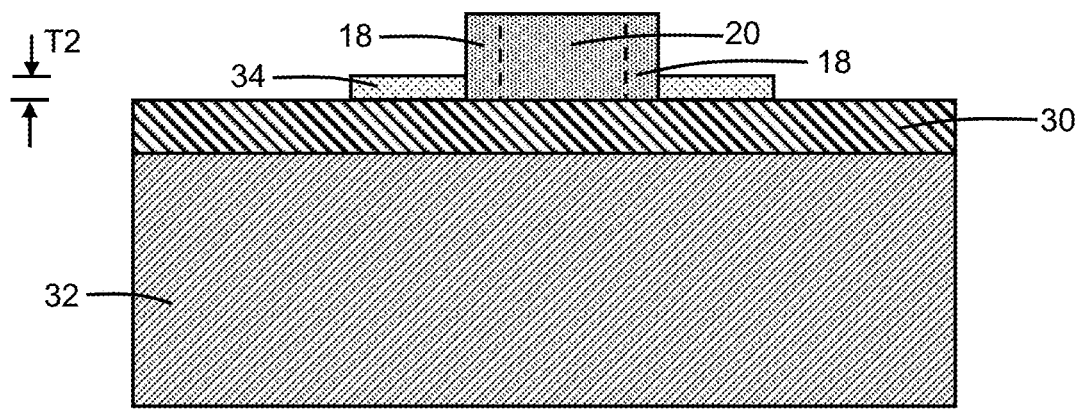
FIG. 2A is a cross-sectional view of the structure taken generally along line 2A-2A in FIG. 1.

With reference to FIGS. 1, 2, 2A and in accordance with embodiments of the invention, a structure 10 for an optical coupler includes a waveguide core section 12, multiple segments 14 and a waveguide core section 16 overlaid with and superimposed on the segments 14, multiple segments 18 and a waveguide core section 20 overlaid with and superimposed on the segments 18, and a waveguide core section 22. The waveguide core section 12 may be connected to a waveguide core 24, the waveguide core section 22 may be connected to a waveguide core 26, and the structure 10 may provide a transition between the waveguide core 24 and the waveguide core 26. The waveguide core section 12, the segments 14 and waveguide core section 16, the segments 18 and waveguide core section 20, and the waveguide core section 22 may be longitudinally arranged with alignment along a longitudinal axis 28. The segments 14, 18 and waveguide core sections 16, 20 are longitudinally positioned in the structure 10 between the waveguide core section 12 and the waveguide core section 22. The segments 14 have a spaced arrangement along the longitudinal axis 28 with gaps between adjacent segments 14. Similarly, the segments 18 have a spaced arrangement along the longitudinal axis 28 with gaps between adjacent segments 18. In an embodiment, the structure 10 may have a length in a range of about 5 microns to about 60 microns.

The segments 14, 18, waveguide core sections 12, 16, 20, 22, and waveguide cores 24, 26 may be positioned over a dielectric layer 30. In an embodiment, the dielectric layer 30 may be comprised of silicon dioxide. In an embodiment, the dielectric layer 30 may be a buried oxide layer of a silicon-on-insulator substrate, and the silicon-on-insulator substrate may further include a handle substrate 32 comprised of a semiconductor material (e.g., single-crystal silicon). The segments 14, 18, waveguide core sections 12, 16, 20, 22, and waveguide cores 24, 26 may be comprised of a semiconductor material, such as single-crystal silicon, and may have a uniform thickness T1. In alternative embodiments, the segments 14, 18, waveguide core sections 12, 16, 20, 22, and waveguide cores 24, 26 may be comprised of a different material, such as silicon nitride, silicon oxynitride, aluminum nitride, a III-V compound semiconductor material, silicon germanium, germanium, a polymer, etc.

In an embodiment, the segments 14, 18, waveguide core sections 12, 16, 20, 22, and waveguide cores 24, 26 may be patterned by lithography and etching processes from a device layer of a silicon-on-insulator substrate without etching fully through the device layer. Sections 36, 37 of a slab layer 34 may be patterned with a separate set of lithography and etching processes from the partially-etched portions of the device layer adjacent to the sides of the segments 18, waveguide core section 22, and waveguide core 26. The slab layer 34 is thinner than the segments 18, waveguide core section 22, and waveguide core 26 and, in an embodiment, the thickness of the slab layer 34 is significantly less than the thickness of the segments 18, waveguide core section 22, and waveguide core 26. The segments 18 have respective lower portions adjacent to the dielectric layer 30 and these lower portions are connected over the thickness of the slab layer 34 to the sections 36 of the slab layer 34. The waveguide core section 22 and waveguide core 26 have respective lower portions adjacent to the dielectric layer 30 and these lower portions are connected over the thickness of the slab layer 34 to the section 37 of the slab layer 34. Lower portions of the waveguide core section 20 in the gaps between the segments 18 lack any connection to the slab layer 34. The slab layer 34 is also not connected to the waveguide core sections 12, 16, segments 14, and waveguide core 24. The waveguide core 24 defines a ridge waveguide structure and the waveguide core 26 defines a rib waveguide structure. The segments 14, 18 and waveguide core sections 12, 16, 20, 22 provide a transition from the ridge waveguide structure to the rib waveguide structure.

The waveguide core section 12 connects the waveguide core section 16 to the waveguide core 24. In an embodiment, the waveguide core section 12 may be tapered with a width dimension that increases with increasing distance from the waveguide core 24. The segments 14, which are positioned adjacent to the waveguide core section 12, may have a width dimension w1 in a direction transverse to the longitudinal axis 28 that varies with increasing distance from the waveguide core section 12 and waveguide core 24. In an embodiment, the width dimension w1 of the segments 14 progressively increases with increasing distance from the waveguide core section 12 and waveguide core 24. In an embodiment, the width dimension w1 of the segments 14 may progressively increase with increasing distance from the waveguide core section 12 and waveguide core 24 based on a linear function to provide a series of trapezoidal shapes. In an alternative embodiment, the width dimension w1 of the segments 14 may progressively increase with increasing distance from the waveguide core section 12 and waveguide core 24 based on a non-linear function, such as a quadratic, parabolic, or exponential function.

The segments 14 may be distributed among a group 38 positioned adjacent to the waveguide core section 12 and a group 39 positioned non-adjacent to the waveguide core section 12 with the group 38 longitudinally between the group 39 and the waveguide core section 12. Segments 14 in the group 38 are connected by the superimposed waveguide core section 16. Segments 14 in the group 39 are disconnected from the waveguide core section 16 and define discrete shapes. Portions of the segments 14 in the group 38 project outwardly from the opposite side edges of the waveguide core section 16, and the segments 14 in the group 38 may be centered relative to the waveguide core section 16. In an embodiment, the width dimension w1 for the segments 14 in the group 38 may be equal to about 0.23 times to about 0.8 times the wavelength of the light (e.g., 1310 nanometers or 1550 nanometers) being received by the structure 10, and the width dimension w1 for the segments 14 in the group 39 may be equal to about 0.23 times to about 1 times the wavelength of the light being received by the structure 10.

The waveguide core section 16 is connected to the waveguide core section 12 and is superimposed on the segments 14. In an embodiment, the waveguide core section 16 may be superimposed on only the segments 14 in the group 38. The waveguide core section 16 may have a width dimension w2 in a direction transverse to the longitudinal axis 28, and the waveguide core section 16 may be tapered opposite to the tapering of the waveguide core section 12 and opposite to the tapering of the segments 14. At any position along the longitudinal axis 28, the width dimension w2 is less than the width dimension w1. In an embodiment, the width dimension w2 of the waveguide core section 16 may progressively decrease with increasing distance from the waveguide core section 12 and waveguide core 24 based on a linear function to provide a trapezoidal shape. In an alternative embodiment, the width dimension w2 of the waveguide core section 16 may progressively decrease with increasing distance from the waveguide core section 12 and waveguide core 24 based on a non-linear function, such as a quadratic, parabolic, or exponential function.

The waveguide core section 22 connects the waveguide core section 20 to the waveguide core 26. In an embodiment, the waveguide core section 22 may be tapered with a width dimension that decreases with decreasing distance from the waveguide core 26. The segments 18, which are positioned adjacent to the waveguide core section 22, may have a width dimension w3 in a direction transverse to the longitudinal axis 28 that varies with increasing distance from the waveguide core section 22 and waveguide core 26. In an embodiment, the width dimension w3 of the segments 18 progressively decreases with decreasing distance from the waveguide core section 22 and waveguide core 26. In an embodiment, the width dimension w3 of the segments 18 may progressively decrease with decreasing distance from the waveguide core section 22 and waveguide core 26 based on a linear function to provide a series of trapezoidal shapes. In an alternative embodiment, the width dimension w3 of the segments 18 may progressively decrease with decreasing distance from the waveguide core section 22 and waveguide core 26 based on a non-linear function, such as a quadratic, parabolic, or exponential function.

The segments 18 may be distributed among a group 40 positioned adjacent to the waveguide core section 22 and a group 41 positioned non-adjacent to the waveguide core section 22 with the group 40 longitudinally between the group 41 and the waveguide core section 22. Segments 18 in the group 40 are connected by the superimposed waveguide core section 20. Segments 18 in the group 41 are disconnected from the waveguide core section 20 and define discrete shapes. Portions of the segments 18 in the group 40 project outwardly from the opposite side edges of the waveguide core section 20, and the segments 18 in the group 40 may be centered relative to the waveguide core section 20. In an embodiment, the width dimension w3 for the segments 18 in the group 40 may be equal to about 0.3 times to about 1 times the wavelength of the light (e.g., 1310 nanometers or 1550 nanometers) being received by the structure 10, and the width dimension w3 for the segments 18 in the group 41 may be equal to about 0.23 times to about 1 times the wavelength of the light being received by the structure 10.

The waveguide core section 20 is connected to the waveguide core section 22 and is superimposed on the segments 18. In an embodiment, the waveguide core section 20 is superimposed on only the segments 18 in the group 40. The waveguide core section 20 may have a width dimension w4 in a direction transverse to the longitudinal axis 28, and the waveguide core section 20 may be tapered opposite to the tapering of the waveguide core section 22 and opposite to the tapering of the segments 18. The width dimension w4 is less than the width dimension w3 at any position along the longitudinal axis 28. In an embodiment, the width dimension w4 of the waveguide core section 20 may progressively increase with decreasing distance from the waveguide core section 22 and waveguide core 26 based on a linear function to provide a trapezoidal shape. In an alternative embodiment, the width dimension w4 of the waveguide core section 20 may progressively increase with decreasing distance from the waveguide core section 22 and waveguide core 26 based on a non-linear function, such as a quadratic, parabolic, or exponential function.

The sections 36 of the slab layer 34 have a width dimension w5 in a direction transverse to the longitudinal axis 28 that varies with decreasing distance from the waveguide core 26. In an embodiment, the width dimension w5 increases with decreasing distance from the waveguide core section 22 and the waveguide core 26. In an embodiment, the width dimension w5 of the sections 36 of the slab layer 34 may progressively increase with decreasing distance from the waveguide core section 22 and waveguide core 26 based on a linear function to provide a series of trapezoidal shapes. In an alternative embodiment, the width dimension w5 of the sections 36 of the slab layer 34 may progressively increase with decreasing distance from the waveguide core section 22 and waveguide core 26 based on a non-linear function, such as a quadratic, parabolic, or exponential function. The width dimension w5 is greater than the width dimension w3.

The tapering of the section 37 of the slab layer 34 is opposite to the tapering of the waveguide core section 22 in that the section 37 widens as the waveguide core section 22 narrows. The section 37 of the slab layer 34 may have a constant width where connected to the waveguide core 26. The section 37 may be wider than any of the sections 36 of the slab layer 34.

The segments 14 and the segments 18 may be positioned at small enough pitch so as not to radiate or reflect light at the wavelength of operation and to act as an effective optical material, and therefore may define metamaterials. In an embodiment, the pitch and duty cycle of the segments 14 may be uniform to define a periodic arrangement. In an embodiment, the pitch and duty cycle of the segments 18 may be uniform to define a periodic arrangement. In an embodiment, the pitch and duty cycle of the segments 14 may differ from the pitch and duty cycle of the segments 18. In alternative embodiments, the pitch and/or the duty cycle of the segments 14 and/or the segments 18 may be apodized (i.e., non-uniform) to define a non-periodic arrangement. In an embodiment, the segments 14, the segments 18, and/or the sections 36 of the slab layer 34 may have a different shape, such as an oval shape. The segments 14, 18 may have vertical sidewalls or, alternatively, may have inclined sidewalls.

Figure 3:
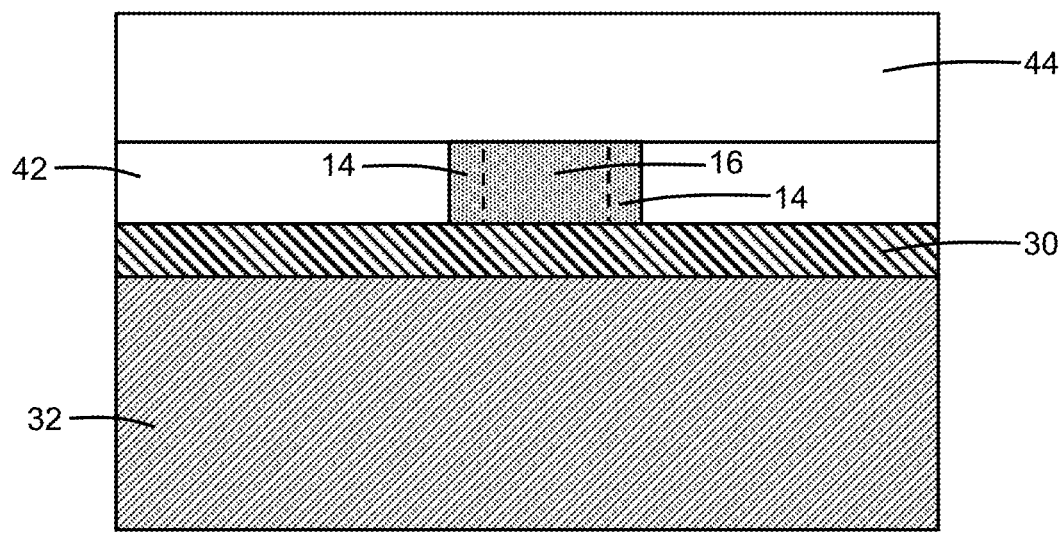
FIGS. 3, 3A are cross-sectional views of the structure at a fabrication stage of the processing method subsequent to FIGS. 2, 2A.
Figure 3A:
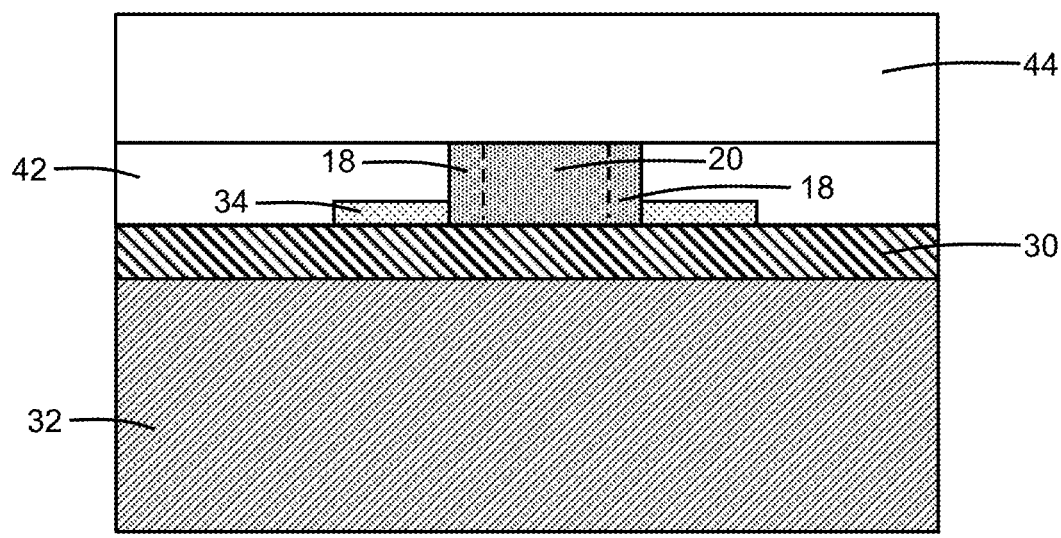

With reference to FIGS. 3, 3A in which like reference numerals refer to like features in FIGS. 2, 2A and at a subsequent fabrication stage, a dielectric layer 42 is formed over the segments 14, 18, waveguide core sections 12, 16, 20, 22, and waveguide cores 24, 26. The dielectric layer 42 may be comprised of silicon dioxide that may be deposited by chemical vapor deposition and planarized by chemical mechanical polishing. A back-end-of-line stack 44 is formed over the dielectric layer 42. The back-end-of-line stack 44 may include one or more interlayer dielectric layers comprised of one or more dielectric materials, such as a silicon dioxide.

The structure 10, in any of its embodiments described herein, may be integrated into a photonics chip that includes electronic components and additional optical components. For example, the electronic components may include field-effect transistors that are fabricated by CMOS processing.

In use, laser light may propagate as optical signals within the structure 10 in a direction from the waveguide core 24 toward the waveguide core 26. The structure 10 may provide a transition between a single-mode ridge waveguide defined by the waveguide core 24 and a single-mode rib waveguide defined by the waveguide core 26. Such transitions may be found in, for example, optical modulators that require electrical connections through the slab layer 34.

The structure 10 may improve the fabrication tolerance for the ridge-to-rib optical coupler while maintaining low insertion loss and resulting in a reduced back reflection. The structure 10 may provide a shortened optical coupler transitioning between ridge and rib waveguide cores in comparison with conventional optical couplers that are comparatively lengthy because of the presence of a gradual continuous taper.

Figure 4:
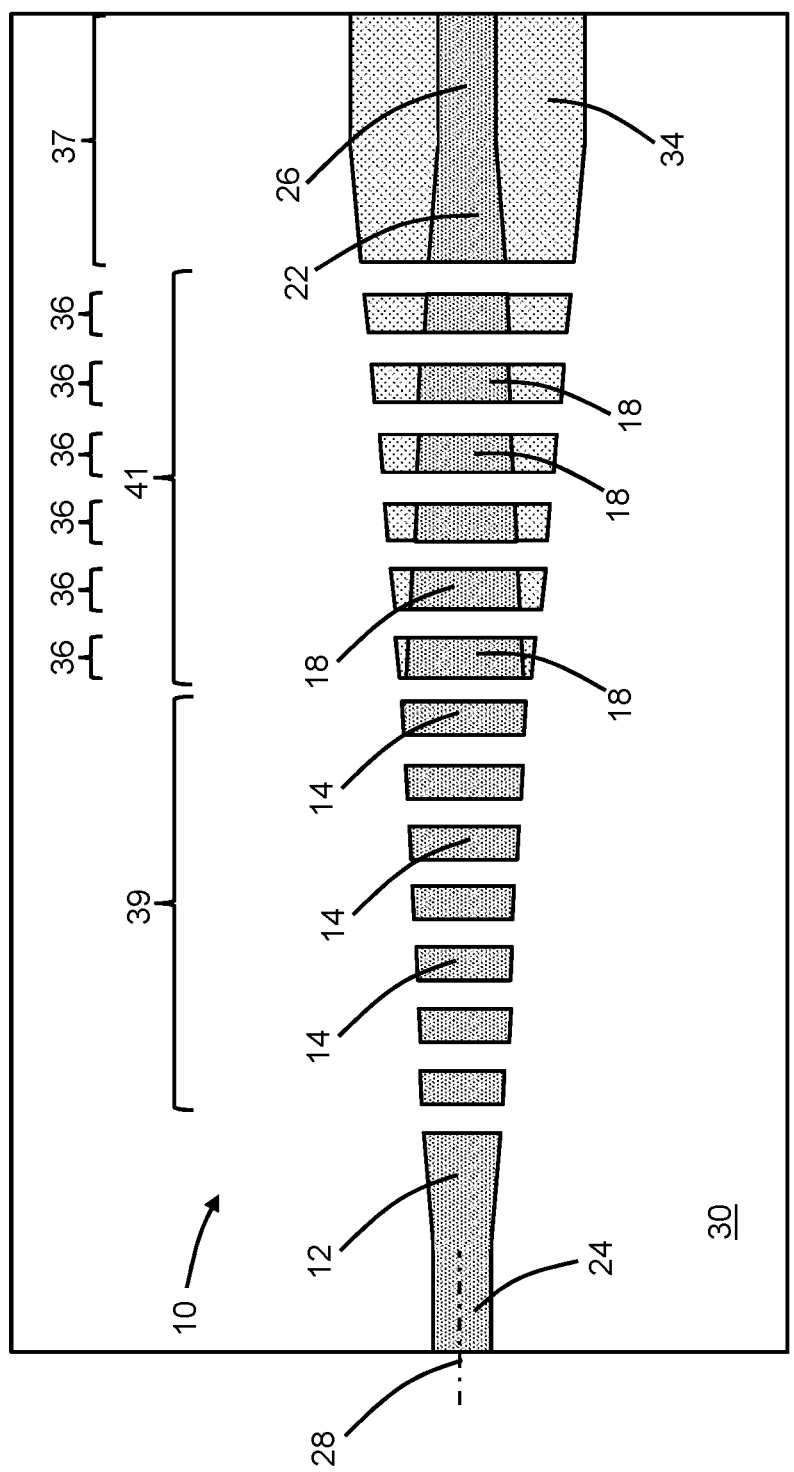
FIG. 4 is a top view of a structure in accordance with alternative embodiments of the invention.

With reference to FIG. 4 in which like reference numerals refer to like features in FIG. 1 and in accordance with alternative embodiments of the invention, the structure 10 may be modified to omit the waveguide core section 16 and the waveguide core section 20. The segments 14 are no longer connected by the waveguide core section 16 and, instead, all of the segments 14 are disconnected from each other and belong to the group 39. Similarly, the segments 18 are no longer connected by the waveguide core section 20 and, instead, all of the segments 18 are disconnected from each other and belong to the group 41.

Figure 5:
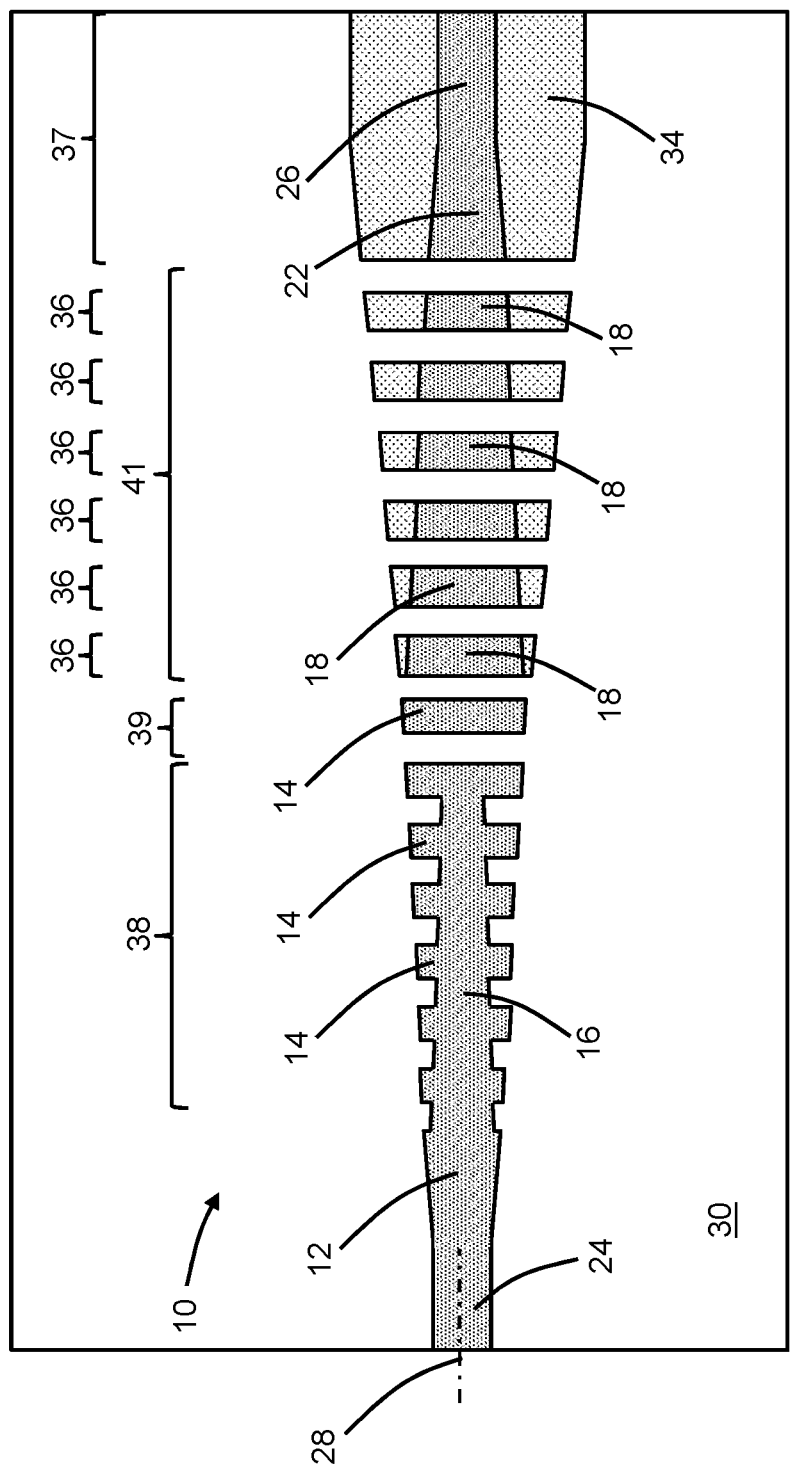
FIG. 5 is a top view of a structure in accordance with alternative embodiments of the invention.

With reference to FIG. 5 in which like reference numerals refer to like features in FIG. 1 and in accordance with alternative embodiments of the invention, the structure 10 may be modified to omit the waveguide core section 20 while the waveguide core section 16 is retained. The segments 18 are no longer connected by the waveguide core section 20 and, instead, all of the segments 18 are disconnected from each other and belong to the group 41.

Figure 6:
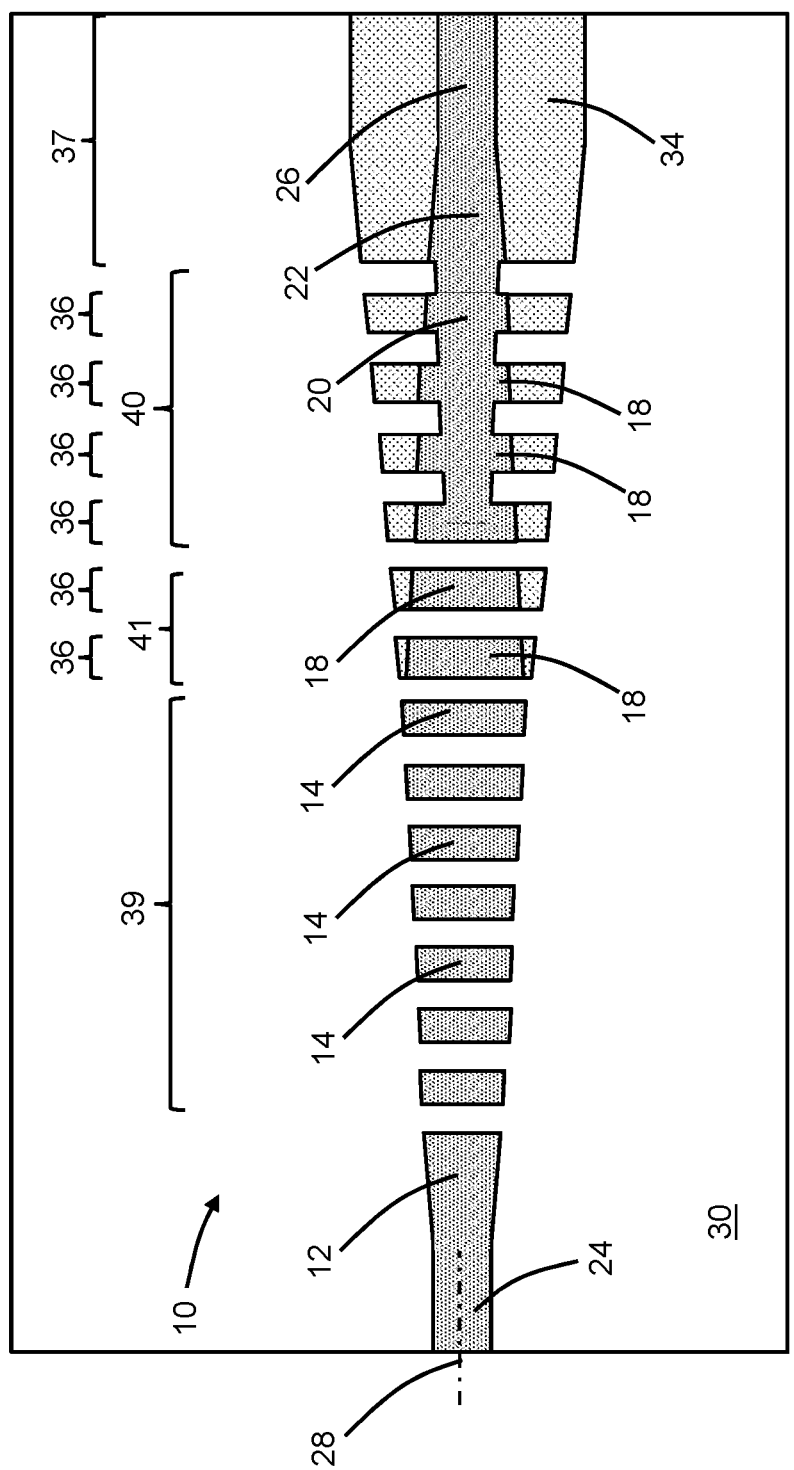
FIG. 6 is a top view of a structure in accordance with alternative embodiments of the invention.

With reference to FIG. 6 in which like reference numerals refer to like features in FIG. 1 and in accordance with alternative embodiments of the invention, the structure 10 may be modified to omit the waveguide core section 16 while the waveguide core section 20 is retained. The segments 14 are no longer connected by the waveguide core section 16 and, instead, all of the segments 14 are disconnected from each other and belong to the group 39.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core;
   a first plurality of segments positioned with a first spaced arrangement along a longitudinal axis;
   a second plurality of segments positioned with a second spaced arrangement along the longitudinal axis between the first plurality of segments and the first waveguide core, the second plurality of segments having a first thickness; and
   a slab layer including a plurality of first sections respectively connected to the second plurality of segments, the slab layer having a second thickness that is less than the first thickness, and the plurality of first sections of the slab layer tapered with a first width dimension that increases with decreasing distance from the first waveguide core.

2. The structure of claim 1 wherein the second plurality of segments are tapered with a second width dimension that decreases with decreasing distance from the first waveguide core.

3. The structure of claim 2 wherein the first width dimension is greater than the second width dimension.

4. A structure comprising:
   a waveguide core;
   a first plurality of segments positioned with a first spaced arrangement along a longitudinal axis;
   a second plurality of segments positioned with a second spaced arrangement along the longitudinal axis between the first plurality of segments and the waveguide core, the second plurality of segments having a first thickness, the second plurality of segments distributed in a first group and a second group;
   a slab layer including a plurality of first sections respectively connected to the second plurality of segments, the slab layer having a second thickness that is less than the first thickness; and
   a first waveguide core section superimposed on the second plurality of segments in the first group.

5. The structure of claim 4 wherein the second plurality of segments in the second group are disconnected from the first waveguide core section.

6. The structure of claim 5 wherein the first group of the second plurality of segments and the first waveguide core section are positioned along the longitudinal axis between the second group of the second plurality of segments and the waveguide core.

7. The structure of claim 4 wherein the first waveguide core section is tapered with a first width dimension that increases with decreasing distance from the waveguide core.

8. The structure of claim 7 further comprising:
   a second waveguide core section connecting the first waveguide core section with the waveguide core, the second waveguide core section tapered with a second width dimension that decreases with decreasing distance from the first waveguide core.

9. A structure comprising:
   a first waveguide core;
   a first plurality of segments positioned with a first spaced arrangement along a longitudinal axis, the first plurality of segments distributed in a first group and a second group;
   a second plurality of segments positioned with a second spaced arrangement along the longitudinal axis between the first plurality of segments and the first waveguide core, the second plurality of segments having a first thickness;
   a slab layer including a plurality of first sections respectively connected to the second plurality of segments, the slab layer having a second thickness that is less than the first thickness; and
   a first waveguide core section superimposed on the first plurality of segments in the first group.

10. The structure of claim 9 wherein the first plurality of segments in the second group are disconnected from the first waveguide core section.

11. The structure of claim 10 further comprising:
    a second waveguide core,
    wherein the first group of the first plurality of segments and the first waveguide core section are positioned along the longitudinal axis between the second group of the first plurality of segments and the second waveguide core.

12. The structure of claim 11 wherein the first waveguide core section is tapered with a first width dimension that decreases with increasing distance from the second waveguide core.

13. The structure of claim 12 further comprising:
    a second waveguide core section connecting the first waveguide core section with the second waveguide core, the second waveguide core section tapered with a second width dimension that increases with increasing distance from the second waveguide core.

14. The structure of claim 1 wherein the slab layer includes a second section connected to the first waveguide core.

15. The structure of claim 1 wherein the second plurality of segments are distributed in a first group and a second group, and further comprising:
   a first waveguide core section superimposed on the second plurality of segments in the first group.

16. The structure of claim 15 wherein the second plurality of segments in the second group are disconnected from the first waveguide core section.

17. The structure of claim 15 wherein the first waveguide core section is tapered with a second width dimension that increases with decreasing distance from the first waveguide core.

18. The structure of claim 1 wherein the first plurality of segments are distributed in a first group and a second group, and further comprising:
   a first waveguide core section superimposed on the first plurality of segments in the first group.

19. The structure of claim 18 wherein the first plurality of segments in the second group are disconnected from the first waveguide core section.

20. The structure of claim 19 further comprising:
   a second waveguide core,
   wherein the first group of the first plurality of segments and the first waveguide core section are positioned along the longitudinal axis between the second group of the first plurality of segments and the second waveguide core.

* * * * *